Figures 4, 5:
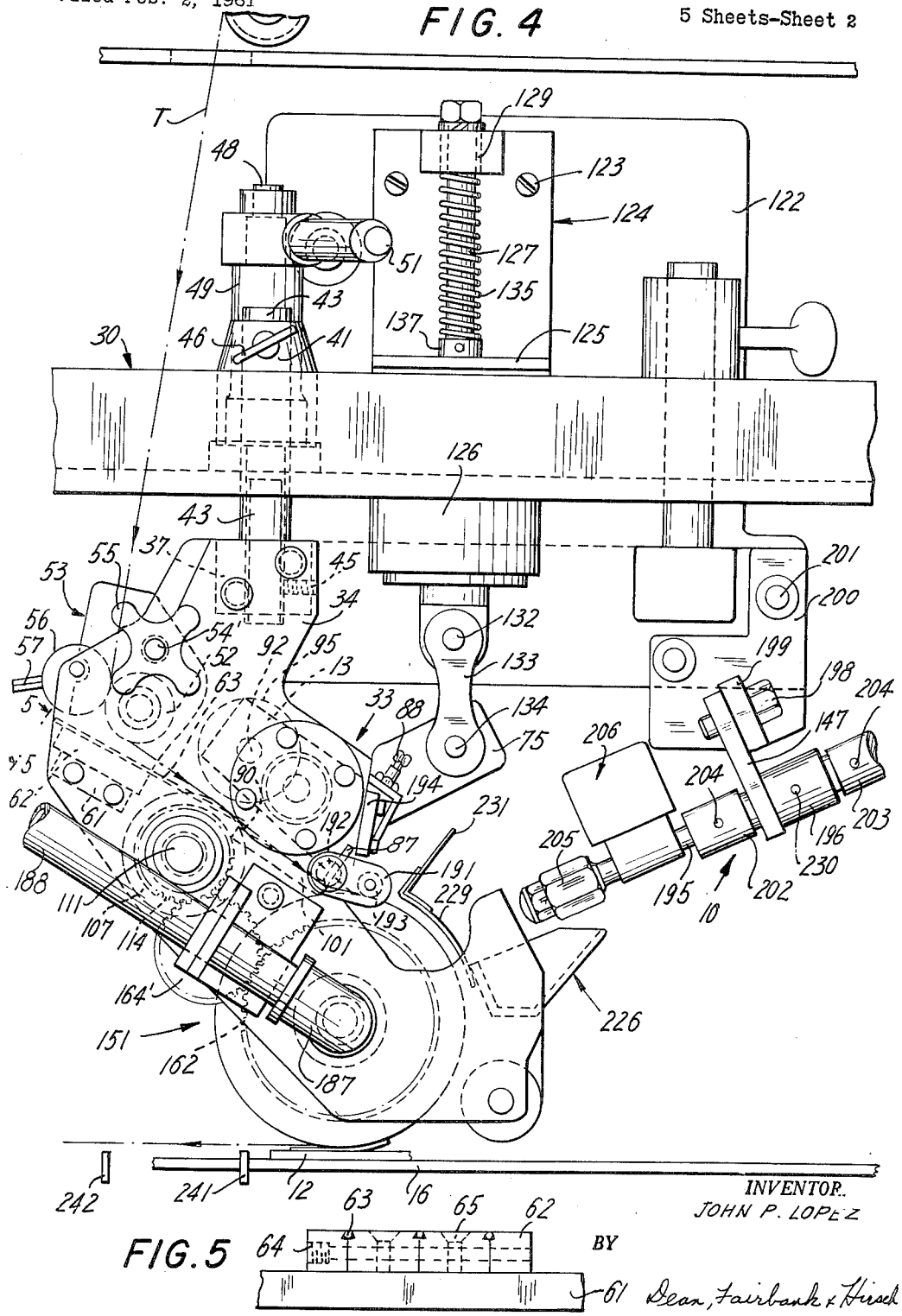

March 1, 1966  J. P. LOPEZ  3,238,081
WATER SPRAYING MECHANISM FOR SHORT LENGTH TAPE FEEDER
Filed Feb. 2, 1961  5 Sheets-Sheet 1
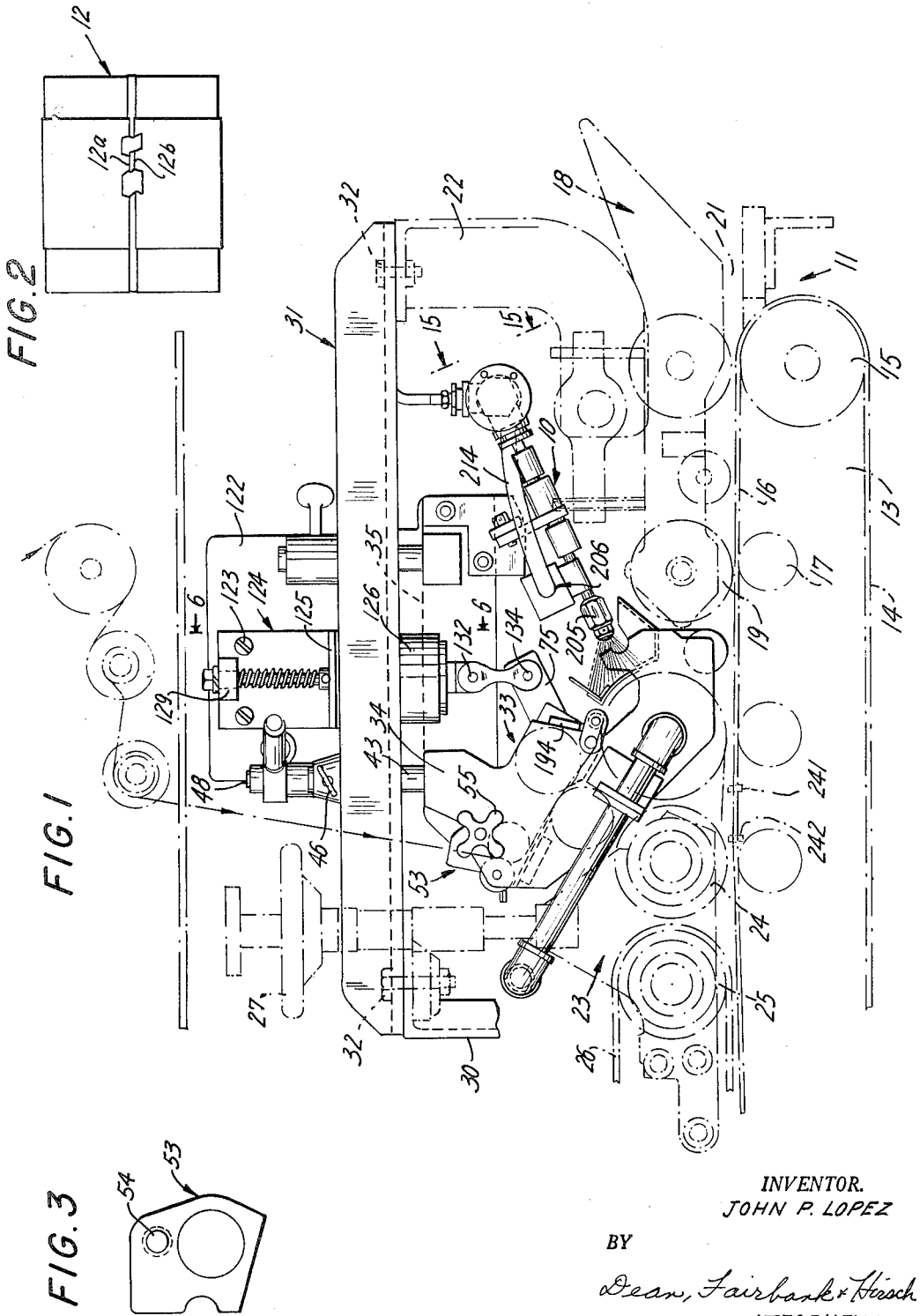
INVENTOR.
JOHN P. LOPEZ
BY
Dean, Fairbank & Hirsch
ATTORNEYS March 1, 1966 J. P. LOPEZ 3,238,081
WATER SPRAYING MECHANISM FOR SHORT LENGTH TAPE FEEDER
Filed Feb. 2, 1961 5 Sheets-Sheet 2

INVENTOR.
JOHN P. LOPEZ
BY
Dean, Fairbank & Hirsch
ATTORNEYS

March 1, 1966        J. P. LOPEZ        3,238,081
WATER SPRAYING MECHANISM FOR SHORT LENGTH TAPE FEEDER
Filed Feb. 2, 1961        5 Sheets-Sheet 3
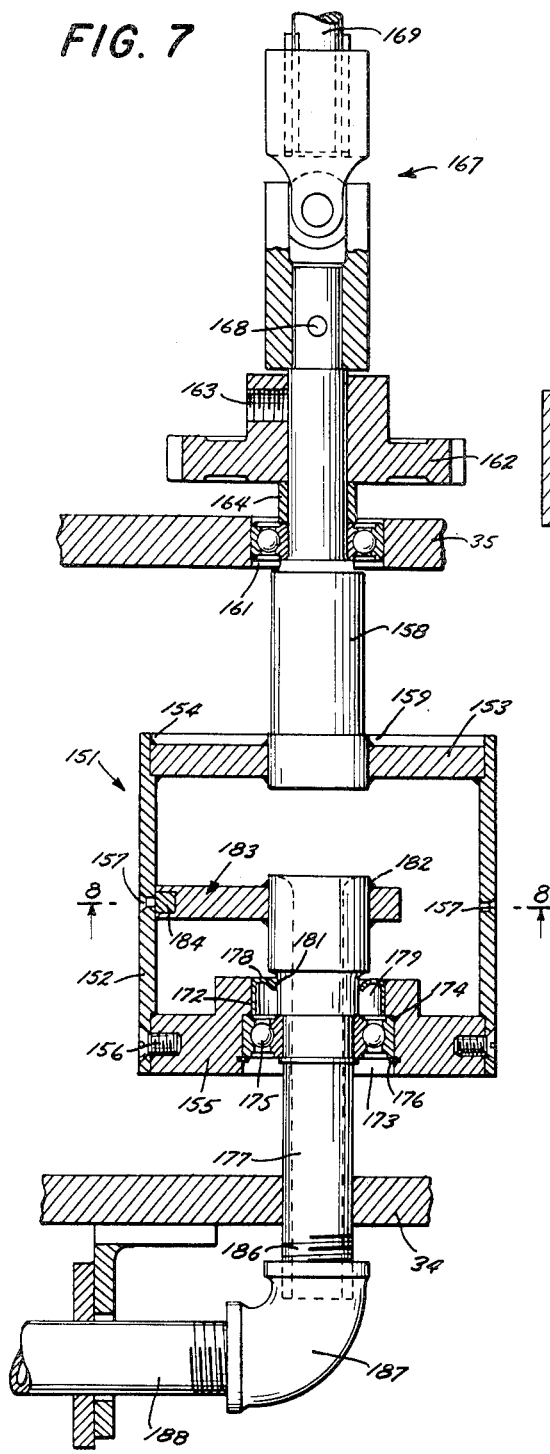
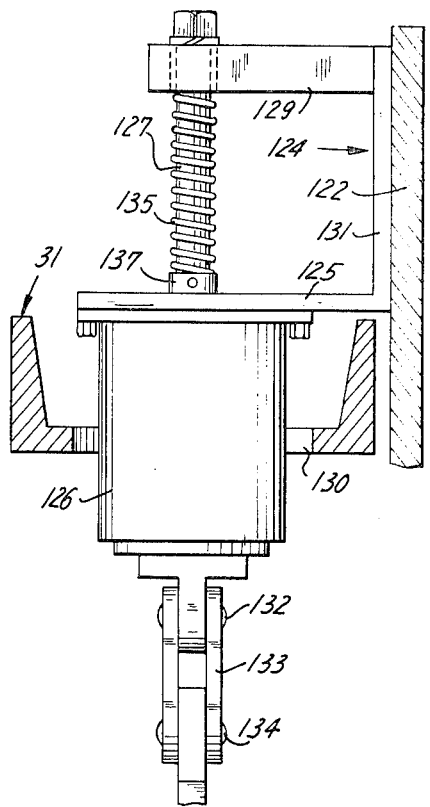
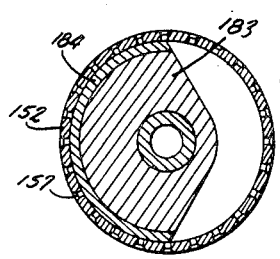
INVENTOR.
JOHN P. LOPEZ
BY
Dean, Fairbank & Hirsch
ATTORNEYS March 1, 1966  J. P. LOPEZ  3,238,081
WATER SPRAYING MECHANISM FOR SHORT LENGTH TAPE FEEDER
Filed Feb. 2, 1961  5 Sheets-Sheet 4
FIG. 11
FIG. 9
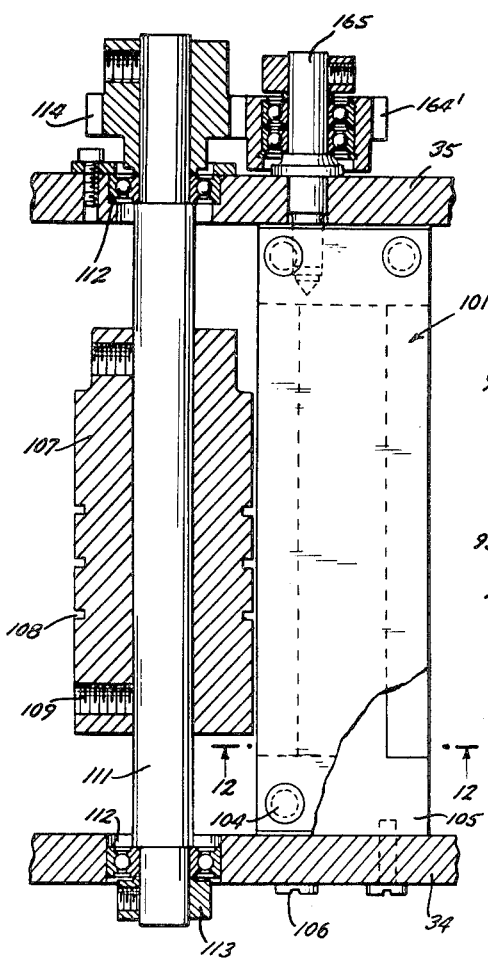
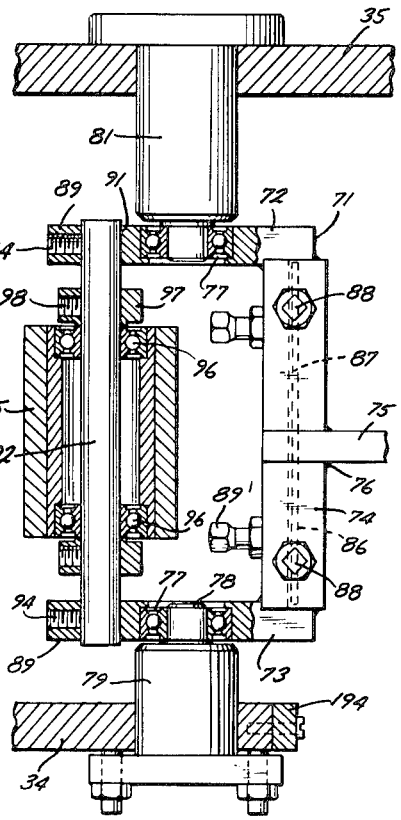
FIG. 12
FIG. 10
FIG. 13
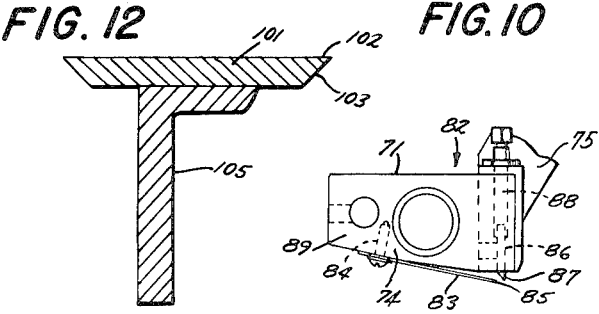
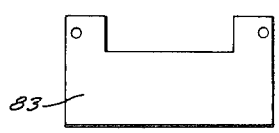
INVENTOR.
JOHN P. LOPEZ
BY
Dean, Fairbank & Hirsch
ATTORNEYS March 1, 1966 J. P. LOPEZ 3,238,081
WATER SPRAYING MECHANISM FOR SHORT LENGTH TAPE FEEDER
Filed Feb. 2, 1961 5 Sheets-Sheet 5

INVENTOR.
JOHN P. LOPEZ
BY
Dean, Fairbank & Hirsch
ATTORNEYS

United States Patent Office 3,238,081
Patented Mar. 1, 1966

3,238,081
WATER SPRAYING MECHANISM FOR SHORT
LENGTH TAPE FEEDER
John P. Lopez, Westfield, N.J., assignor to Universal Corrugated Box Machinery Corp., Linden, N.J., a corporation of New Jersey
Filed Feb. 2, 1961, Ser. No. 86,813
7 Claims. (Cl. 156—354)

This invention relates to mechanism for lubricating short lengths of tape that are applied to moving folded box blanks.

As conducive to an understanding of the invention, it is noted that where a continuous length of tape is drawn from a roll and is successively severed to desired lengths and then has its gummed surface moistened by the use of water transfer rollers that convey water thereto from a reservoir, unless the rollers are precisely adjusted the tape may be insufficiently or excessively moistened, with the result that it may not properly adhere to the edges of the box blanks.

Furthermore, even if the rollers initially are properly adjusted, vibration during operation of the equipment may cause them to become damaged, and in addition the surface of the rollers may collect dirt due to the glue adhering thereto, causing improper moistening of the tape.

It is accordingly among the objects of the invention to provide a water spray mechanism that may readily be incorporated in a tape feeding and applying equipment of the type shown in co-pending application Serial No. 759,922, filed September 9, 1958, now abandoned and which, in synchronization with the severing of such tape, will moisten the lengths of tape with a desired quantity of liquid, without need for exact tolerances in the adjustment of the moistening means and without collection of dirt that would interfere with proper moistening of such lengths of tape, so that the latter may be successively applied to the moving box blank with assurance that such lengths of tape will securely adhere thereto.

According to the invention, these objects are accomplished by the arrangement and combination of elements hereinafter described and more particularly recited in the claims.

Figure 15:
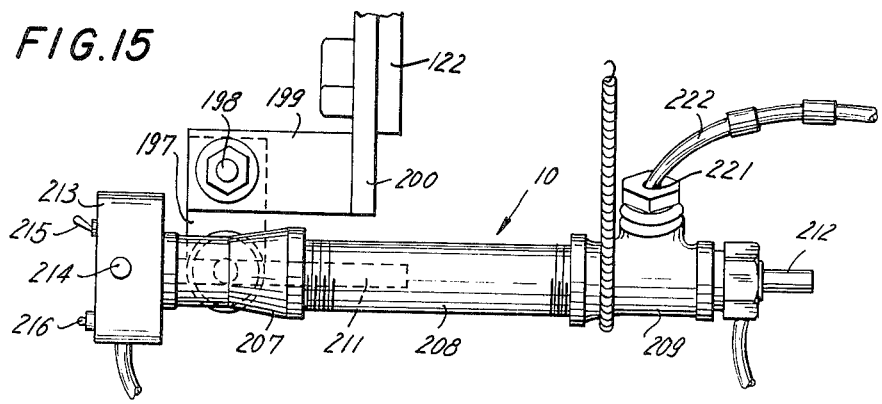
Figure 14:
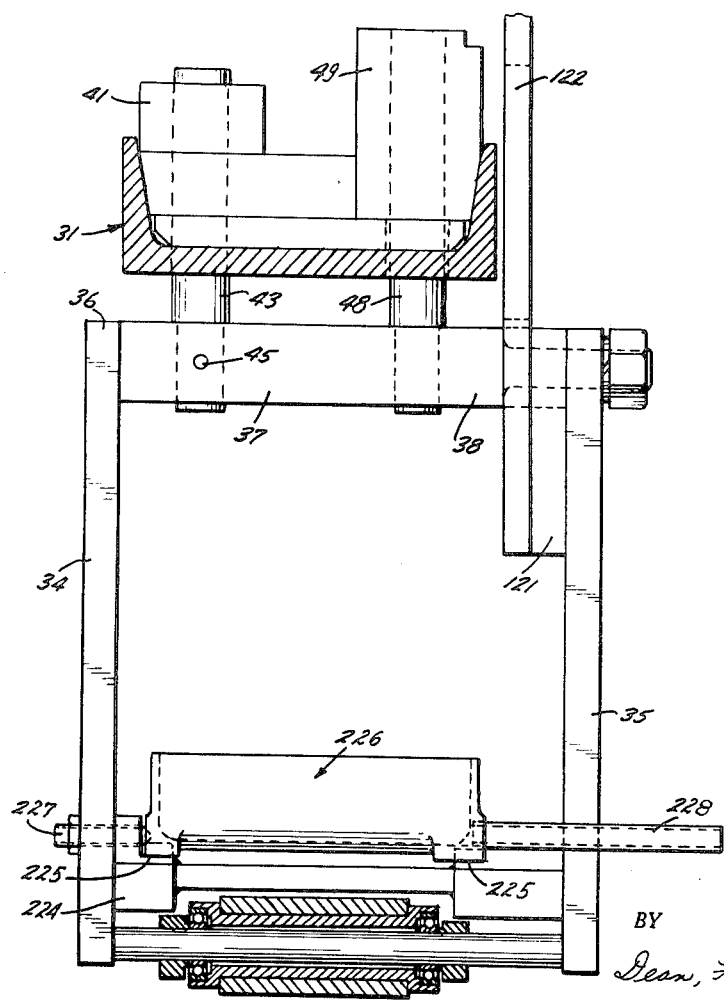

In the accompanying drawings in which is shown one of various possible embodiments of the invention, FIG. 1 is a side elevational view of the water spray mechanism incorporated in a tape feeding and applying equipment, FIG. 2 is a plan view of a folded box blank, FIG. 3 is a detail view of one of the tape guides, FIG. 4 is a view similar to FIG. 1 on an enlarged scale, FIG. 5 is a view taken along line 5—5 of FIG. 4, FIG. 6 is a view taken along line 6—6 of FIG. 1, FIG. 7 is a sectional view of the tape applying drum, FIG. 8 is a sectional view taken along line 8—8 of FIG. 7, FIG. 9 is a top plan view partially in cross section, and with parts broken away, of the tape advance and cutting member, FIG. 10 is a side elevation of the tape advance and cutting lever, FIG. 11 is a top plan view partially in cross section, and with parts broken away, of the cutting anvil, FIG. 12 is a sectional view taken along line 12—12 of FIG. 11, FIG. 13 is a plan view of the tape stripper blade, FIG. 14 is an end view showing the support for the mechanism, and FIG. 15 is a view taken along line 15—15 of FIG. 1.

Referring now to the drawings, the water spray mechanism 10 is shown in FIGS. 1 and 4 incorporated with a tape feed and applying equipment, the latter being associated with a conveyor unit 11 for advancing folded box blanks 12 of the type having juxtaposed edges 12a, 12b which are to be secured.

As the tape feed and applying mechanism is of the type shown and described in the above mentioned co-pending application Serial No. 759,922, it will only be described to the extent necessary for a clear understanding of the invention.

As shown in FIG. 1, the conveyor unit comprises a lower conveyor 13 which may comprise an endless belt 14 riding around rollers 15, the upper run 16 of the belt being supported by rollers 17.

Positioned above the upper run 16 of belt 14 is a frame 18 which mounts a plurality of rollers 19 adapted to retain the folded box blank 12 against the belt 14 when such blank is inserted into the inlet 21 of the conveyor.

The frame 18 is supported from a bracket 22 in manner such that its position may be vertically adjusted to accommodate box blanks of different thickness.

A second frame 23 is provided which also carries a plurality of rollers 24, 25, the roller 25 mounting one end of an endless belt 26 and the roller 24 being longitudinally spaced from roller 19 of frame 18. The frame 23 is supported in manner such that its position may be vertically adjusted, as by rotation of hand wheel 27.

A support 31, illustratively a channel member, is secured as by bolts 32 to brackets 22 and 30 so that it extends in horizontal position over the conveyor 13.

Depending from the channel member 31 is a tape feed unit 33 which, as shown in FIG. 14, comprises a pair of spaced side plates 34, 35 connected at their upper edges 36, as by transverse spacer bar 37 (FIG. 4), to form a rigid assembly.

Rising from one end of spacer bar 37 and extending through bushing 41, rising from channel support 31, is stud 43 secured to the spacer bar as by set screw 45, the stud being retained in desired position in the bushing by thumb screw 46.

Rising from the other end of spacer bar 37, and rotatably mounted with respect thereto, is a screw 48 which extends through a tapped bushing 49 rising from channel member 31. The upper end of the screw 48 desirably has a reversible ratchet bar 51 mounted thereon so that upon rotation of screw 48 the taper unit 33 may be raised and lowered as desired, guided by the stud 43.

Extending transversely between the plates 34 and 35 is a roller 52 (FIG. 4) which slidably mounts a pair of tape guide plates 53 (FIG. 3) which have a left and right hand tapped opening 54 through which extends an adjustment screw 54' having a left and right hand thread, said screw having a knob 55 secured thereto for rotation thereof to move the plates 53 toward and away from each other.

Thus, the spacing between plates 53 may be adjusted to accommodate tape of desired width.

Also positioned between plates 34, 35 is an eccentrically mounted roller 56 (FIG. 4) which is weighted as at 57 so that it will tend to move toward roller 52. Thus, when a length of tape T from a suitable supply roll (not shown) is positioned between rollers 52, 56, the tape T, though free to move forward, cannot move backward, for the eccentric roller 56 will clamp the tape T against roller 52 to prevent such backward movement.

Extending transversely between plates 34, 35, beneath rollers 52, 56, is a support bar 61 (FIGS. 4 and 5) which mounts a plurality of clamp bars 62, illustratively four in number, extending at right angles thereto. The adjacent upper edges of the clamp bars 62 are conformed to grip the ends of an associated guide finger 63 when a screw 64, extending through the bars 62, is tightened and the clamp bars are secured to the support bar 61 as by screws 65. The fingers 63 serve to guide the tape T to the tape feeding and cutting mechanism hereinafter described.

The tape feeding and cutting mechanism comprises a yoke 71 (FIGS. 9, 10) having a pair of parallel legs 72 and 73 and a cross bar 74, to the central portion of which one end of an arm 75 is affixed, as by welding at 76.

Each of the legs 72, 73 has a bearing 77 in which is positioned the end 78 of studs 79, 81, respectively, mounted on the side plates 34, 35 of the tape unit 33. Thus, the lever 82, defined by yoke 71 and arm 75, is pivotally mounted on said studs.

Secured to the yoke 71 is a stripper blade 83 (FIGS. 10, 13) which desirably comprises a substantially rectangular strip of resilient material, secured as by screws 84 to the legs 72, 73 adjacent the ends 89 thereof, and extending toward the other ends thereof, the free edge 85 of the blade being normally spaced from the undersurface of the legs, as shown in FIG. 10.

The cross bar 74 in its undersurface has an elongated groove 86 in which a knife 87 is positioned, screws 88 extending through the top of the bar into the groove 86 permitting adjustment of the knife 85, and transverse screws 89' providing for locking of the knife in adjusted position.

Each of the ends 89 of legs 72, 73 of the yoke 71 has an opening 91 (FIG. 9) to receive a rod 92 which is secured in said ends by set screws 94. The rod 92 mounts a feed roller 95 which preferably has bearings 96 at each of its ends, through which the rod 92 extends, the roller being restrained from transverse movement along the rod 92 by collars 97 secured to the rod by set screws 98.

Positioned beneath the knife 87 is an anvil 101 (FIGS. 11 and 12) extending transversely between the side plates 34 and 35, the free ends 90 of finger 63 extending to said anvil, as shown in FIG. 4.

As shown in FIGS. 11 and 12, the anvil, which desirably is a rectangular plate having its longitudinal edge 102 beveled as at 103, is secured as by screws 104 to the ends of a cross bar 105 extending transversely between plates 34, 35 and secured thereto as by screws 106.

Positioned beneath the fingers 63 is a roller 107 (FIGS. 4 and 11) having grooves 108 in its periphery in which the fingers 63 may lie, respectively. The roller 107 is secured by set screw 109 to a shaft 111 extending transversely through bearings 112 mounted on the plates 34, 35, the shaft 111 being restrained from transverse movement by a collar 113 secured to one end and by a gear 114 secured to the other end.

Means are provided to pivot the lever 82 to effect advance of the tape T and to sever such tape.

To that end, as shown in FIGS. 4 and 14, a spacer plate 121 is secured to side plate 35 and mounts a supporting plate 122 which rises from said spacer plate parallel to the vertical plane thereof.

Affixed to the upper portion of plate 122, as by screws 123, is a substantially L-shaped bracket 124, the lateral leg 125 of the bracket mounting a solenoid 126 which extends through an opening 130 in the channel member 31.

The upper end of the plunger 127 of the solenoid extends through an arm 129 extending laterally outward from the vertical leg 131 of the bracket 124. The lower end of the plunger 127 is pivoted, as at 132, to one end of a link 133, the other end of which is pivoted, as at 134, to the end of arm 75 of lever 82.

Means are provided normally to urge the lever 82 in a clockwise direction about its pivotal mount. As shown in FIGS. 4 and 14, such means desirably comprise a compression spring 135 encompassing the upper end of plunger 127 and compressed between the arm 129 and a collar 137 secured to the plunger 127. The compression spring thus normally urges the plunger 127 downwardly to urge the lever 82 in a clockwise direction, so that the knife 87 will normally be moved against the anvil 101 and the roller 95 away from roller 107.

Means are provided to transfer the lengths of tape T severed by the knife 87, in the manner to be described, to the box blank 12. To this end, the tape transfer unit 151, shown in FIGS. 4 and 7, is provided. This unit comprises a vacuum drum including a sleeve 152, in one end of which a disc 153 is affixed as by welding at 154. The other end of the sleeve 152 also has a disc 155 affixed thereto, but in this case as by set screws 156, to permit ready removal thereof. The sleeve 152 has a plurality of centrally located perforations 157 therethrough arranged in a row extending circumferentially therearound. The disc 153 has a shaft 158 affixed at one end thereto, as at 159, and extending axially outward therefrom through a bearing 161 mounted in the side plate 35. A gear 162 is affixed as by set screw 163 to the shaft 158, a spacer sleeve 164 encompassing the shaft between bearing 161 and gear 162. The gear 162 through idler gear 164' (FIGS. 4 and 11) mounted on stud shaft 165 drives gear 114 and roller 107 upon rotation of shaft 158.

To rotate shaft 158, a universal connector fitting 167 is affixed to the outer end of shaft 158, as by pin 168, and to a shaft 169 driven by suitable drive means (not shown).

The disc 155 has an axial bore 172 of enlarged diameter at its outer end, as at 173, defining an annular shoulder 174 on which a bearing 175 is seated, said bearing being retained in position by a split ring 176.

Extending laterally through the side plate 34 of the tape feed unit 33, and fixed with respect thereto, is a pipe 177 which also extends through the bearing 175, the pipe serving as a shaft for the transfer unit 151.

In order to provide an airtight seal, an annular sealing member 178 is positioned in the reduced diameter portion 179 of bore 172, engaging the periphery of the pipe, as at 181.

Secured to the inner end of the pipe, as by welding at 182, is a disc 183, the periphery of which engages the inner surface of the sleeve 152 over an angle of substantially 180° to cover the corresponding perforations 157 through said sleeve 152, the periphery of said disc 183 having a sealing strip 184 thereon to insure dependable sealing of the associated perforations.

The disc 183 is positioned in the sleeve, as shown in FIG. 8, so that the perforations 157 on the left half of the sleeve 152 will be covered and the perforations in the right half of the sleeve will be open.

The outer end of pipe 177 is threaded, as at 186, and mounts a fitting 187 to which a pipe 188 is connected, said pipe 188 being connected to a source of suction (not shown).

In order to permit relatively short lengths of tape to be picked up by the transfer unit 151, means are provided to force the tape passing between the knife 87 and anvil 101 against the periphery of sleeve 152. In the illustrative embodiment herein shown, such means comprises a pair of links 191, as shown in FIG. 4, pivotally mounted, respectively, as at 192 to the side plates 34, 35. The free ends of the links rotatably mount a roller 193 which extends transversely between the side plates over the periphery of sleeve 152. To limit the upward movement of the roller, an adjustable stop means or bar 194 is secured to the front edge of the plate 34, as shown in FIG. 9, the lower end of said stop member serving as an abutment for the associated link 191. Thus, the tape T will pass between roller 193 and sleeve 152, and the tape T will be guided into juxtaposition with the sleeve 152 to be held thereagainst by suction applied through the perforations 157.

Means are provided to apply moisture to the gummed surface of the tape T after it has been cut to the desired length.

To this end, as shown in FIGS. 1, 4 and 15, the spraying assembly 10 is provided. The spraying assembly comprises a pipe 195 extending through a sleeve 196 rigid with a mounting plate 197 which is secured by screw 198 to an arm 199 extending laterally from a plate 200 secured, as by screws 201, to plate 122.

The pipe 195, which is at an incline as shown, has collars 202, 203 thereon straddling the sleeve 196 and secured in place by set screws 204.

The nose end of the pipe 195 mounts a nozzle 205 and a solenoid-operated valve 206 is connected to the pipe 195 between the nozzle 205 and collar 202 to control the spray from the nozzle.

The rear end of the pipe 195 is connected to a fitting 207 and a pipe 208 extends from said fitting at right angles to pipe 195 and is connected at its end to a second fitting 209. A heater 211 is mounted in fittting 207 and extends into pipe 208, and a thermostat (not shown) is mounted in fitting 209, said thermostat having a control screw 212.

A connector box 213 is secured to the fitting 207 and receives wires 214 from the solenoid valve 206. The connector box has an "On Off" switch 215 to control the heater 218 and an indicating light 216 which shows when the heater 211 is on, said indicator, said switch, the heater and thermostat being electrically connected in conventional manner.

The fitting 209 has an inlet port 221 to which a pipe 222 is connected to supply water to the nozzle.

Means are provided to collect excess water sprayed from the nozzle 205 and to restrict such spray.

To this end, as shown in FIG. 14, a support bar 224 is secured to side plates 34, 35 and extends transversely thereacross. The bar 224 has a pair of opposed ledges 225 on which a trough 226 is seated, the trough being releasably retained on the ledges by a set screw 227, a pipe 228 being connected to said trough to drain the latter.

Secured to the rear wall of the trough 226 at each end, and rising therefrom, are curved fingers 229 (FIG. 4) which are spaced laterally from the drum 151. The upper ends of the fingers mount a baffle plate 231 which extends transversely thereacross, the function of which will be hereinafter described.

Means are provided to operate the equipment in timed relation with the advance of the blox blanks by the conveyor 13. To this end, as shown in FIG. 1, a pair of switch fingers 241, 242 is provided, the positions of which are adjustable and which may be engaged by the leading edge of the box blank as it is advanced.

*Operation.*—To ready the equipment for operation, the tape T is threaded from the supply roll between rollers 52 and 56, over fingers 63, which guide the tape to the anvil 101, and beneath feed roll 95 and knife 87, and then between roller 193 and drum 151.

The spray assembly 10 is held in fixed position by set screw 230 in sleeve 196. This screw is loosened and the position of pipe 195 is adjusted so as to space nozzle 205 a desired distance from the vacuum drum 151, and the screw 230 is tightened. In normal use, when tapes of either of two widths may be used, the collars 202 and 203 are secured to the pipe 195 at desired distances from the plate 147 so that when the set screw 230 in sleeve 196 is loosened, the assembly 10 may be moved to the front or rear to the desired position.

The heater 211 is then turned on by operating the associated switch 215. The indicating lamp 216 will glow when the thermostat calls for more heat and go off when the water is at the desired temperature.

The switch fingers 241 and 242 are spaced by a distance equal to the length of tape desired and then the conveyor 13 is actuated so that the upper run 16 thereof will move in the direction indicated. Suction is applied to drum 151 and the drive motor (not shown) actuated to rotate shaft 158 (FIG. 7).

The equipment will operate as follows:

As the solenoid 126 is normally de-energized, the lever 82 will be urged by the spring 135 to the position shown in FIG. 4, in which the knife 87 is against the anvil 101 and the feed roller 95 is spaced from roller 107 so that the tape T will not be advanced.

When the leading edge of the box blank 12 engages switch finger 241, the solenoid 126 will be energized so that the lever 82 will be pivoted in a counterclockwise direction from the position shown in FIG. 4. Thus, the knife 87 will be moved away from anvil 101 and roller 95 will urge the tape T resting on fingers 63 against the periphery of continuously driven roller 107. By reason of resilient plate 83, when the knife 87 is moved away from the anvil, the free edge of the plate 83 will retain the free end of the tape against the anvil for subsequent advance past the knife.

As a result, the tape T will be advanced beneath the knife 87 and the roller 193, the latter guiding the tape T against the periphery of said drum over the perforations 157, and will be advanced by said drum with its gummed surface directed outwardly, the suction applied to the tape through the perforations 157 securely retaining the tape in fixed position with respect to the drum.

When the switch finger 241 is engaged, the solenoid valve 206 controlling the spray nozzle 205 will also be activated to open the valve to provide a fine spray of water onto the gummed surface of tape T as the latter is advanced by the drum past the nozzle 205.

By reason of the baffle 231, substantially no spray will reach the operating elements of the machine and excess water will drop into the trough 226, from which it will drain through pipe 228.

When the leading edge of the box blank engages switch finger 242, the solenoid 126 will be de-energized and the spring 135 will quickly pivot lever 82 in a clockwise direction so that the knife 87 will sever the tape and the roller 95 will be moved away from roller 107 to stop further pulling of tape from the supply roll.

The engagement of switch finger 242 by the leading edge of the box blank 12 will also de-energize solenoid 206. However, through suitable circuits a slight time delay is provided before the solenoid valve 206 is closed to ensure that the trailing edge of the severed tape will be moistened.

The distance between the switch fingers 241, 242 is such as to provide the desired length of tape to be applied to the box blank and, since the drum 151 holds the tape substantially as soon as it passes the knife 87, the tape cannot shift. Thus, the severed and moistened length of tape is carried by the drum 151 to be pressed against the folded box blank over the juxtaposed edges thereof to connect such edges. Since the perforations 157 in drum 151 are sealed by gasket 184 substantially 180 degrees from the point where the tape is first brought into control with the drum, the suction against the tape will cease at the position it is brought into contact with the box blank so that the tape will adhere to the latter and readily be stripped off the drum 151 as the box blank is advanced.

Since the end of the tape drawn from the supply roll at the time of severing by the knife is exactly at such knife edge, and since the distance that such end must travel before it is in control with the box blank is fixed, it is apparent that by proper positioning of the switch fingers and the distance therebetween, the location at which the end of the tape will be brought into contact with the box blank and the length of the severed strip, may be set as desired.

By reason of the relatively short distance between the knife 87 and the roller 193 which guides the tape against the drum 151, it is apparent that extremely short lengths of tape may be cut, and such short lengths will be securely retained against the drum by reason of the suction applied through the perforations 157.

With the spray assembly herein described, dependable and uniform moistening of the gummed tape will be achieved without the need for precise adjustment required when conventional water transfer rollers are used, which may readily come out of adjustment, with the result that the tape is either insufficiently or excessively moistened.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A machine for applying tape having a gummed surface to a moving piece of work, comprising tape feeding and tape cutting means, said feeding means comprising a pair of rollers, at least one of which is movable toward the other, said cutting means comprising a single pair of complementary cutting members, at least one of which is movable toward the other, said tape being movable between said rollers, a rotatable transfer unit having a circular periphery positioned adjacent said cutting member, said periphery being in the path of movement of the tape past said cutting means, to convey the tape onto the work as the latter is moving, the entire periphery of said transfer unit being rotatable past the path of movement of said tape, suction means in said drum coacting with the inner surface of the tape to retain the latter against the periphery of the transfer unit, means to effect continuous release of the tape from the transfer unit at substantially the location where the tape is moved by the transfer unit onto the movable work, a spraying assembly having a spray nozzle positioned to direct a spray of liquid against the gummed surface of said tape as the latter is advanced by the transfer unit, said spraying assembly including a valve, and control means to actuate said movable roller and said movable cutting member for alternately feeding and cutting controlled lengths of tape, said control means actuating said valve to provide a spray of water against the gummed surface of said tape when said movable roller is actuated to feed said tape onto the rotatable transfer unit.

2. The combination set forth in claim 1 in which said control means are adjustable and are positioned in the path of movement of said work and actuated thereby to actuate said movable roller and said movable cutting member, the lengths of the tape being severed being dependent upon the setting of said control means, said valve being closed when said control means actuates said movable cutting member.

3. The combination set forth in claim 2 in which means are provided to retain said valve open for a slight period after said movable cutting member is actuated, whereby the trailing edge of the severed tape advanced by the rotatable transfer unit will be moistened.

4. The combination set forth in claim 1 in which a trough is positioned beneath said nozzle adjacent the periphery of said transfer unit to collect excess liquid discharge from said nozzle.

5. The combination set forth in claim 4 in which a baffle member is provided between said spray nozzle and said cutting member to deflect the spray discharged from the nozzle away from said cutting member.

6. The combination set forth in claim 1 in which said spraying assembly comprises a water heater and a thermostat to control the temperature of the water discharged from said nozzle.

7. The combination set forth in claim 1 in which said spray nozzle is adjustably mounted to permit variation of the distance between said nozzle and the periphery of said transfer unit.

References Cited by the Examiner

UNITED STATES PATENTS

| Re. 20,955 | 12/1938 | Krueger | 118—9 |
| 1,477,336 | 12/1923 | Fay et al. | 156—357 |
| 1,904,874 | 4/1933 | Meader | 156—547 |
| 2,483,458 | 10/1949 | Fischer et al. | 156—521 |
| 2,689,056 | 9/1954 | Dewyer. | |
| 2,721,669 | 10/1955 | Keely | 156—351 |
| 2,721,670 | 10/1955 | Shenigo | 156—353 |

EARL M. BERGERT, *Primary Examiner.*

CARL F. KRAFFT, HAROLD ANSHER, *Examiners.*